(12) United States Patent
Selker

(10) Patent No.: US 6,182,098 B1
(45) Date of Patent: Jan. 30, 2001

(54) NEXT/CURRENT/LAST TICKER GRAPHICAL PRESENTATION METHOD

(75) Inventor: Edwin Joseph Selker, Palo Alto, CA (US)

(73) Assignee: International Business Machines Corporation, Armonk, NY (US)

(*) Notice: Under 35 U.S.C. 154(b), the term of this patent shall be extended for 0 days.

(21) Appl. No.: 09/121,205

(22) Filed: Jul. 22, 1998

(51) Int. Cl.[7] ........................................ G06F 17/21
(52) U.S. Cl. .................... 707/526; 707/501; 345/355; 345/124; 345/126
(58) Field of Search .................... 707/517, 523, 707/526, 540, 547, 501; 345/334, 339, 341, 342, 349, 973, 976, 977, 126, 123, 124, 343, 355

(56) References Cited

U.S. PATENT DOCUMENTS

| | | | |
|---|---|---|---|
| 5,303,388 | * 4/1994 | Kreitman et al. | 345/348 |
| 5,485,197 | * 1/1996 | Hoarty | 348/7 |
| 5,515,486 | * 5/1996 | Amro et al. | 345/437 |
| 5,724,492 | * 3/1998 | Matthews, III et al. | 345/419 |
| 5,873,109 | * 2/1999 | High | 707/517 |
| 5,959,621 | * 9/1999 | Nawaz et al. | 345/329 |
| 5,977,975 | * 11/1999 | Mugura et al. | 345/352 |
| 6,005,579 | * 12/1999 | Sugiyama et al. | 345/355 |
| 6,072,460 | * 8/2000 | Marshall et al. | 345/113 |
| 6,075,533 | * 6/2000 | Chang | 345/341 |
| 6,098,085 | * 8/2000 | Blonder et al. | 707/531 |

OTHER PUBLICATIONS

"Scroller Applet User's Guide" ©1998 LodeStar Consulting, Cape Town, South Africa. Dated Jan. 27, 1998.*
NewsWheel (Java®applet). ©1998 Camerata, Inc. Documentation page dated Mar. 26, 1998.*
Naick, Bijoy. "VertTicker.java" webpage from http://javaboutique.internet.com, including source code dated Dec. 1997.*
Meeker, Elijah Dean. "The Java–tized Homepage of Elijah Dean Meeker" including screen shots and source code dated Jan. 4, 1996 of AnimNav.java.*

* cited by examiner

Primary Examiner—Joseph H. Feild
(74) Attorney, Agent, or Firm—Robert Buckley (57) ABSTRACT

A method for displaying a group of headlines from a headline stream across the bottom of a computer graphical user interface display provides a solid polygon shaped display which displays a headline, its immediate predecessor and its immediate successor on adjacent polygon faces. At predetermined intervals the bar rotates so that the successor headline moves into a dominant position, the previous headline moves to a predecessor position, and a new successor headline is displayed. In one embodiment, the predecessor and successor headlines are foreshortened to enhance the suggestion of a three-dimensional solid polygon being displayed and rotated about a central axis. The headline display method is less distracting than the usual ticker tape display, and is easier to read because the eye does not have to follow moving text. In another embodiment, the user double clicks on the a displayed headline to retrieve and display an associated news story. In another embodiment, the user can advance or retreat the display along the headline stream by alternatively single clicking on a successor or predecessor headline, respectively. In another group of embodiments, the invention defines an object for displaying headline type information.

19 Claims, 7 Drawing Sheets

NEXT/CURRENT/LAST TICKER GRAPHICAL PRESENTATION METHOD

RELATED APPLICATION

This U.S. Patent Application is related to a co-pending U.S. patent application entitled "User-Centered Push Methods and System," Ser. No. 08/979,064, filed Nov. 26, 1997. Both Patent Applications are assigned to the International Business Machines Corporation.

FIELD OF THE INVENTION

The invention generally relates to information processing systems, and more specifically, to a method for displaying information via a graphical user interface. The invention has a particular applicability to IBM® computers and computer systems (IBM is a registered trademark of the International Business Machines Corporation).

BACKGROUND OF THE INVENTION

Ticker tape displays in which information scrolls horizontally across a computer display screen are common. When a user sees a headline of interest, he moves a pointer to the headline and 'clicks' to retrieve a news story associated with the headline. Advertisers also use the ticker tape display to scroll advertising teasers which when 'clicked' will retrieve more information related to an advertised product. The advantages of the ticker display are that they attract the eye of the user, and they use only a narrow horizontal strip of the computer graphics display monitor and can be placed out of the way near the top or bottom of the screen. The disadvantages of the moving ticker tape display are that the moving information is distracting, and it is difficult for the eye to follow moving textual information. As a result such displays increase user stress and fatigue.

Displays which present information on the revolving sides of an elongated polygon are known. The technique was developed before the advent of motion pictures and television, and has been used in both of these media. But the revolving elongated polygon display has not been used to present headline type information in the manner of the ticker tape display. The inherent superiority of the revolving elongated polygon over the ticker tape scrolling display has not previously been appreciated with respect to user stress and fatigue factors.

What is needed is an improved display method for presenting headline type information to a user, a method which will relieve user stress.

SUMMARY OF THE INVENTION

This need, and others that will become apparent, is met by the present invention which provides an elongated polygon having headline type information presented in a static manner along its faces, each face displaying one headline. At fixed intervals, the polygon rotates slowly about its central axis and then pauses to reveal a new headline. The headlines do not scroll, so the information is easy to read and is less distracting than the ticker tape. The image of the periodically revolving elongated polygon and its headlines is typically displayed across the bottom of the computer screen.

In a specific embodiment, the user positions a pointer and double clicks on a displayed headline to activate a retrieval process for a news story associated with the headline.

In another specific embodiment, the user positions a pointer and single clicks on a displayed previous or next headline causing the selected headline to replace the currently displayed headline and to advance or retard the display with respect to a continuous headline stream. This feature is useful for Web channels which deliver a continuous stream of news headlines, stock quotations, and like information.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein.

DESCRIPTION OF THE PREFERRED EMBODIMENT

Figure 1:
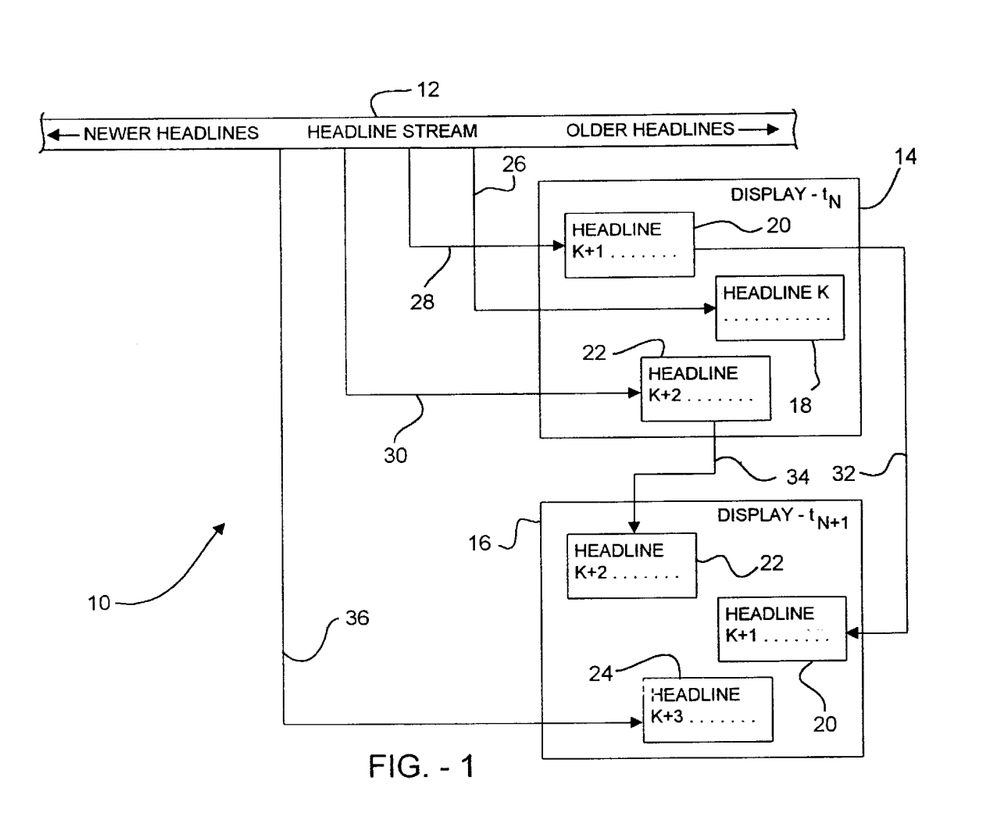
FIG. 1 is a schematic diagram which illustrates a headline display method according to one aspect of the present invention.

With reference to FIG. 1 there is shown a schematic diagram illustrating a method for displaying headline information in a computer system via a graphical user interface. The method is designated generally by the reference numeral 10, and includes a headline stream 12, a display screen at time $t_N$ 14 and a second display screen 16 at a later time $t_{N+1}$.

The display screen 14 includes displays of headlines K 18, K+1 20, and K+2 22, while the display screen 16 includes displays of headlines K+1 20, K+2 22, and K+3 24. Arrows 26, 28, 30 represent processes which initially obtain individual headlines from the headline stream 12 for display on the screen 14. Arrows 32, 34 represent processes which replace displayed headlines by immediate successor displayed headlines on screen 16, while arrow 36 represents a process which obtains an individual successor headline from the headline stream for display on screen 16.

A headline stream is a continuous series of brief sequences of alphanumeric symbols, each sequence independent of any other sequence of the stream, and each sequence of symbols having a successor sequence. The sequences are referred to as headlines because they are often associated with related news stories, or in the case of advertising, with product descriptions. The headline stream is available from a source, sometimes referred to as a channel. The source of the headline stream is typically another computer process, and it is common for some buffering to be involved. For purposes of the present invention, it is assumed that such a source exists within a computer system, and that the display method 10 has access to the stream of headlines 12.

One way to think of a headline stream is to compare it to a broadcast television channel. Whether you have your TV set turned on or not does not change the fact that the channel is broadcasting. When you turn on your TV set and begin to watch, you are receiving and viewing what the channel is broadcasting while you watch. When you stop watching, you are no longer viewing what is being broadcast, even though the information is still available to other viewers, some of whom continue to watch. The information is simply always there for the taking. In the same sense, the headlines of a headline stream are always there for the taking. All you need to do is to connect to the stream and start displaying the headlines. And when you are done, you can disconnect and stop displaying headlines. The same as with the TV set. It is for this reason that headline streams are sometimes referred to as 'channels' or 'news channels' on the Internet.

In general, headline K 18 is an arbitrarily chosen headline within the headline stream 12. Headline K+1 20 is the immediate successor headline to headline K 18, and headline K+2 22 is the immediate successor headline to headline K+1 20, etc. The headlines K 18, K+1 20, and K+2 22 are said to be adjacent headlines. Thus at some arbitrary time $t_N$ the display screen 14 displays the three adjacent headlines K, K+1, and K+2 obtained from the headline stream 12.

In a specific embodiment of the display method 10, a stream of headlines 12 must be provided, wherein each headline in the stream 12 has a successor headline. Thus headline K has a successor headline K+1, and headline K+1 has a successor headline K+2, etc. The phrase "successor headline" and the phrase "immediate successor" are both used at various times in this Specification and mean the same thing. The successor headline is the headline that immediately follows another headline in the headline stream. A predecessor headline is the headline that comes immediately before another headline in the headline stream. Thus headline K+2 is the successor to headline K+1, while headline K+1 is the predecessor headline to headline K+2.

The specific embodiment of the display method 10 also includes processes for obtaining a headline and a predetermined number of successors and simultaneously displaying those headlines, e.g., headlines K 18, K+1 20, and K+2 22 on display screen 14.

The specific embodiment of the display method 10 also includes a process for replacing each displayed headline by its immediate successor headline at predetermined intervals. Thus, at time $t_{N+1}$, headline K 18 is replaced at screen 16 by headline K+1 20, headline K+1 is replaced by headline K+2 22, and a successor headline to headline K+2, headline K+3 24, is obtained and replaces the original display of headline K+2 at screen 16. This process of replacing the displayed headlines by their successors at predetermined intervals is repeated until the display process is stopped.

Take note that in the described display method, no particular format nor location is defined for any displayed headline, nor is any ordering of headlines defined other than the fact that the method calls for the display of a headline and a predetermined number of successor headlines with updating at periodic intervals.

Figure 2:
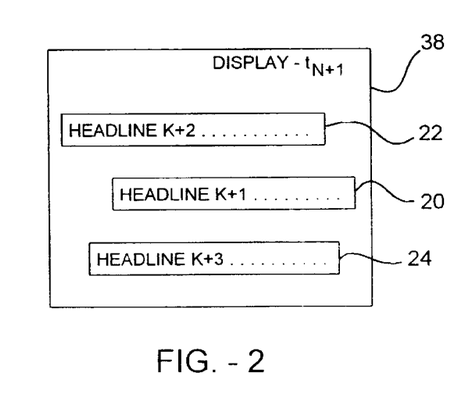
FIG. 2 is a schematic diagram which illustrates headlines displayed as single lines of symbols.

With these thoughts in mind, we consider another specific embodiment of the display method 10, as illustrated in FIG. 2, a schematic diagram of a display screen 38 at time $t_N$ in which headlines are each displayed as a single line of symbols. Thus headlines K+1 20, K+2 22, and K+3 24 are each displayed as a single line of symbols, or another way of saying it, as a single line of text. Note that no specific order nor location is defined for any displayed headline.

Figure 3:
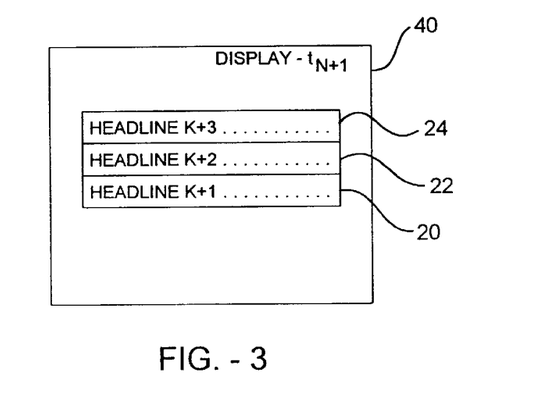
FIG. 3 is a schematic diagram which illustrates stacked single line headlines according to another aspect of the invention.

FIG. 3 is another schematic diagram which illustrates a specific embodiment of the display method 10 in which the displayed headlines are single-line, are 'stacked' and are arranged in a headline stream order. The particular headlines shown in FIG. 3 on display screen 40, are arranged with the 'oldest' headline K+1 20 being located at the bottom position of a 'stack,' while the newer headlines K+2 22 and K+3 24 are 'stacked' on top of headline K+1. The word 'stack' as used here means a vertical array of displayed headlines, as shown in FIG. 3.

Figure 4:
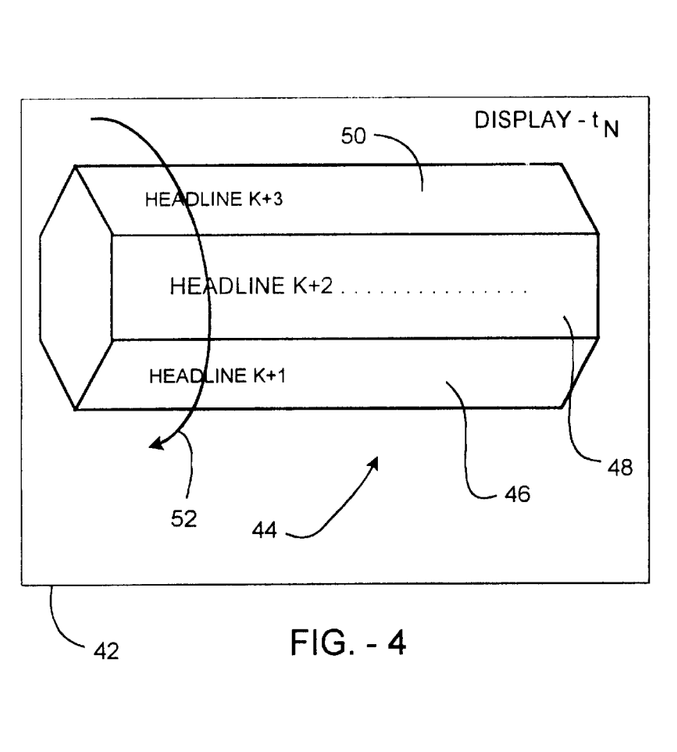
FIG. 4 is a schematic diagram which illustrates the stacked headlines displayed one headline per face of a solid polygon which rotates periodically about its long axis.

FIG. 4 is a schematic diagram which illustrates another specific embodiment of display method 10 in which displayed single-line, 'stacked' headlines appear along adjacent sides of an elongated solid polygon having a central axis in the horizontal direction. FIG. 4 illustrates a display screen 42 and a displayed elongated solid hexagon, designated generally by the reference numeral 44.

The solid hexagon 44 includes three visible side surfaces 46, 48, 50, respectively, each displaying one single-line headline. Headline K+1 appears along surface 46. Headline K+2 appears along surface 48. Headline K+3 appears along surface 50. The font appearance and size in headline K+1 on surface 46 has been modified to appear to be a projection of the surface 46. The font appearance and size in headline K+3 on surface 50 has also been modified to appear to be a projection of the surface 50. Both of these fonts are foreshortened and do not attract the user's attention so much as the full sized, unmodified font used for headline K+2 on the forward surface 48. The phrases 'forward surface' and 'directly forward' refer to a surface which is projected directly at a viewer and which is parallel with the computer system graphic display screen.

As indicated by the curved arrow 52, the solid hexagon is rotated about its central axis in the direction shown such that the headline K+2 and surface 48 will rotate into the position currently occupied by headline K+1 and the surface 46. In like manner, headline K+3 and surface 50 will rotate into the position currently occupied by headline K+2 and surface 48. The display method 10 requires that at predetermined intervals, i.e., periodically, each displayed headline be replaced by its successor headline. This requirement is accomplished in the present embodiment by the periodic rotation of the solid hexagon about its central axis, as described.

Figure 5:
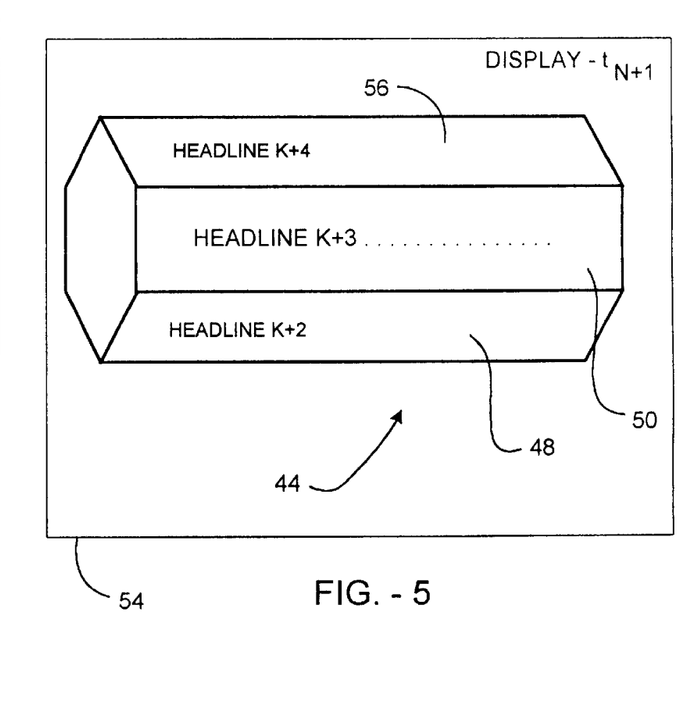
FIG. 5 is a schematic diagram which illustrates the display shown in FIG. 4 after a rotation to a next headline.

FIG. 5 is a schematic diagram which illustrates the result of such periodic to replacement of headlines by successor headlines. FIG. 5 shows a display screen 54 at time $t_{N+1}$. The rotation referred to with respect to FIG. 4 is complete. The surface 48 and the headline K+2, which previously faced directly forward, now occupies the bottom position in the 'stack.' The surface 50 and the headline K+3 has been rotated to the directly forward position, such that the headline K+3 has replaced the position previously occupied by the headline K+2. A new headline K+4 appears at surface 56, having been obtained from the headline stream 12, and having replaced the position previously occupied by the headline K+3.

In a specific embodiment of the invention, the rotation of the elongated polygon 44 pauses with one polygon surface directly forward. The periodic rotation is slow and then the rotation pauses for most of the interval between rotations. Such behavior provides an easier to read and less distracting headline display.

Figure 6:
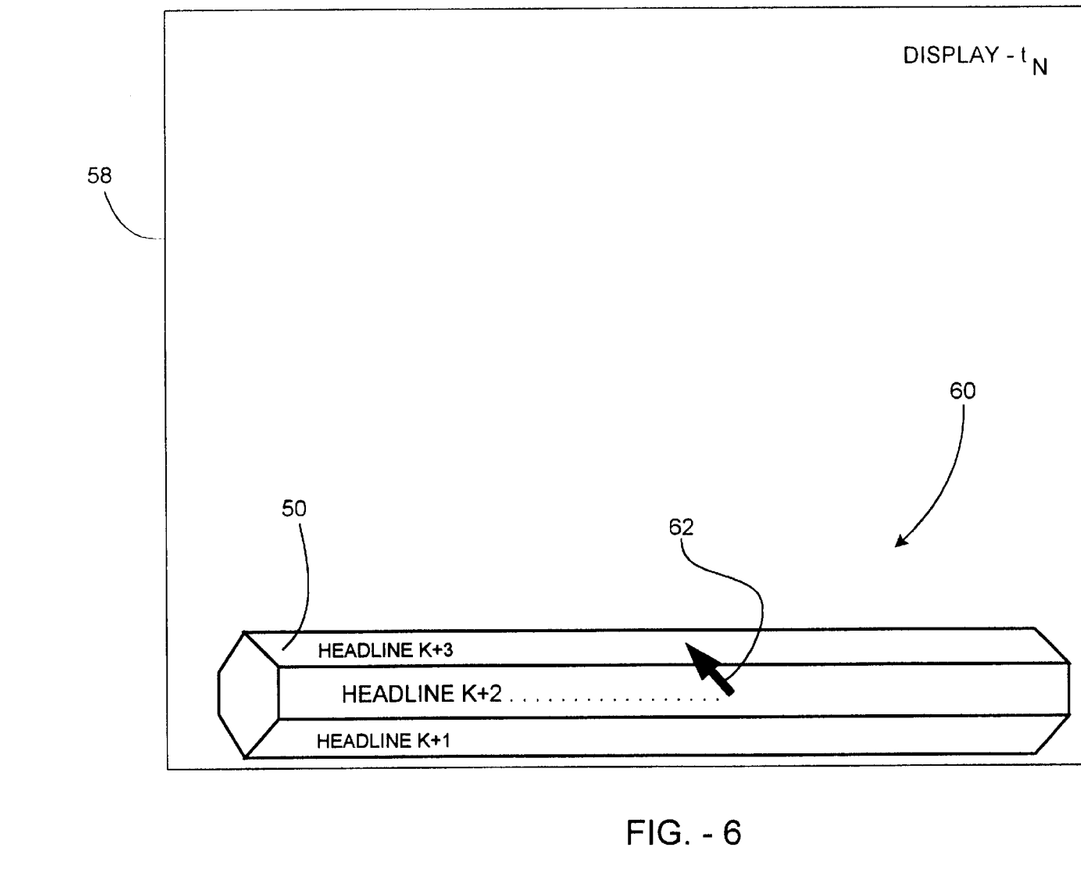
FIG. 6 is a schematic diagram which illustrates use of a displayed cursor to advance one headline.

FIG. 6 is another schematic diagram which illustrates several additional aspects of the present invention. FIG. 6 illustrates a display screen 58 at time $t_N$ and having an elongated solid hexagon 60 bearing headlines displayed across the bottom of the screen. A displayed pointer 62 is shown pointing at the headline K+3 on surface 50. The user has moved the pointer 62 to its current position and now 'clicks' on the headline K+3. This user sequence results in headline K+3 rotating to the directly forward position shown in FIG. 7, a schematic diagram which illustrates a display screen 64 at time $t_{N+1}$. This specific embodiment of the display method 10 permits the user to control the updating of the displayed headlines. By pointing at and 'clicking' on the headline K+3, the user is able to effect an update before the automatic periodic update. The user can continue to point and 'click' on the newest headline to cause it to rotate immediately to the directly forward position. This feature permits the user to move forward in the headline stream 12, one headline at a time, and to do so independently of the automatic updating process.

Figure 7:
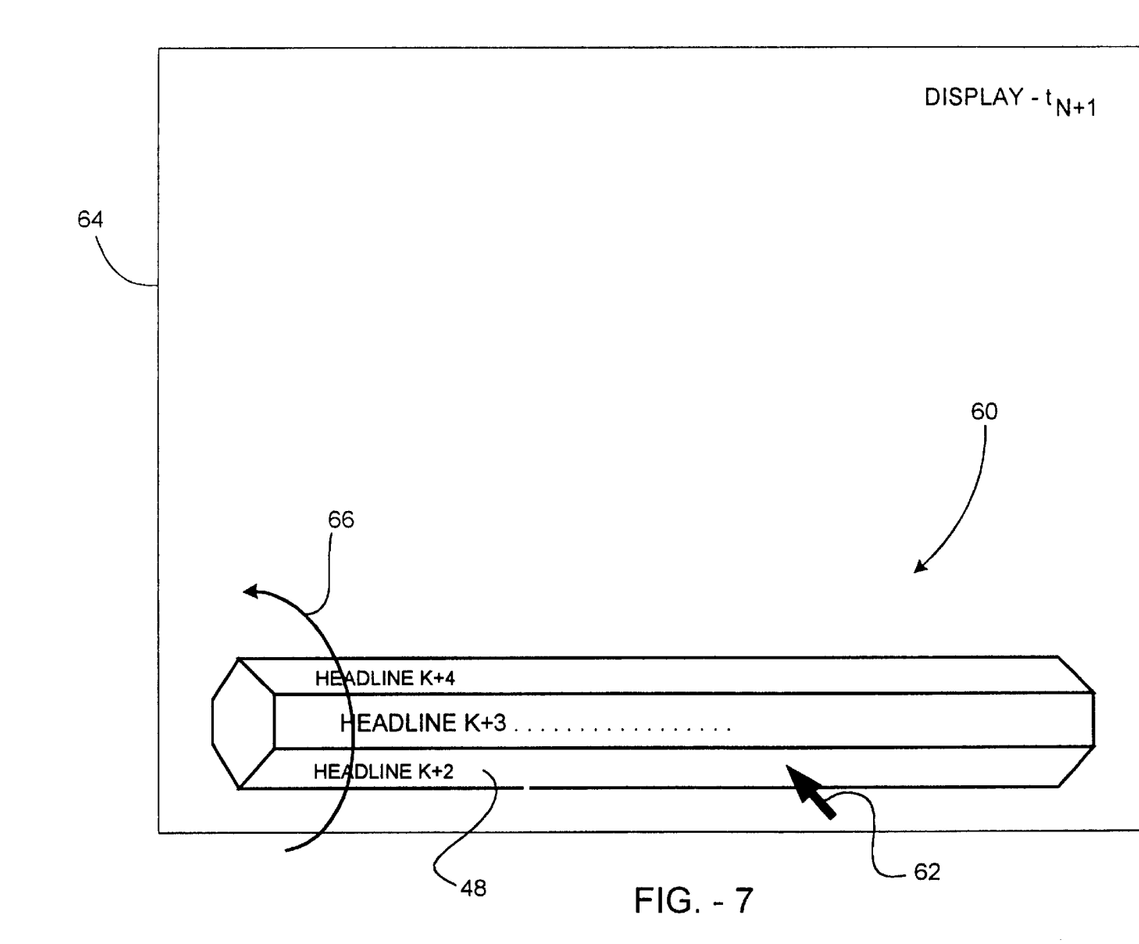
FIG. 7 is a schematic diagram which illustrates use of a displayed cursor to backup one headline.

In FIG. 7, the user has moved the pointer 62 to the headline K+2, at the bottom of the 'stack' on surface 48. When the user 'clicks' on the headline K+2, the solid polygon 60 rotates in the opposite direction such that headline K+2 replaces headline K+3 and headline K+3 replaces headline K+4, and an old headline, K+1 is retrieved and occupies the surface previously occupied by the headline K+2. This specific embodiment of the display method 10 permits the user to move backward in the headline stream 12, one headline at a time, indicated by the arrow 66. The result of having pointed to and 'clicked' on the headline K+2 is illustrated in FIG. 8, another schematic diagram which illustrates a display screen 68 at time $t_{N+2}$.

In another specific embodiment of the display method 10, the user moves the pointer 62 to the headline K+2 which faces directly forward. When the user single 'clicks' on the directly forward displayed headline a first time, the periodic rotation and updating stop. When the user single 'clicks' on the directly forward displayed headline a second time, the periodic rotation and updating resumes. This feature permits the user to turn the updating feature on and off while still retaining the display of headlines.

Figure 8:
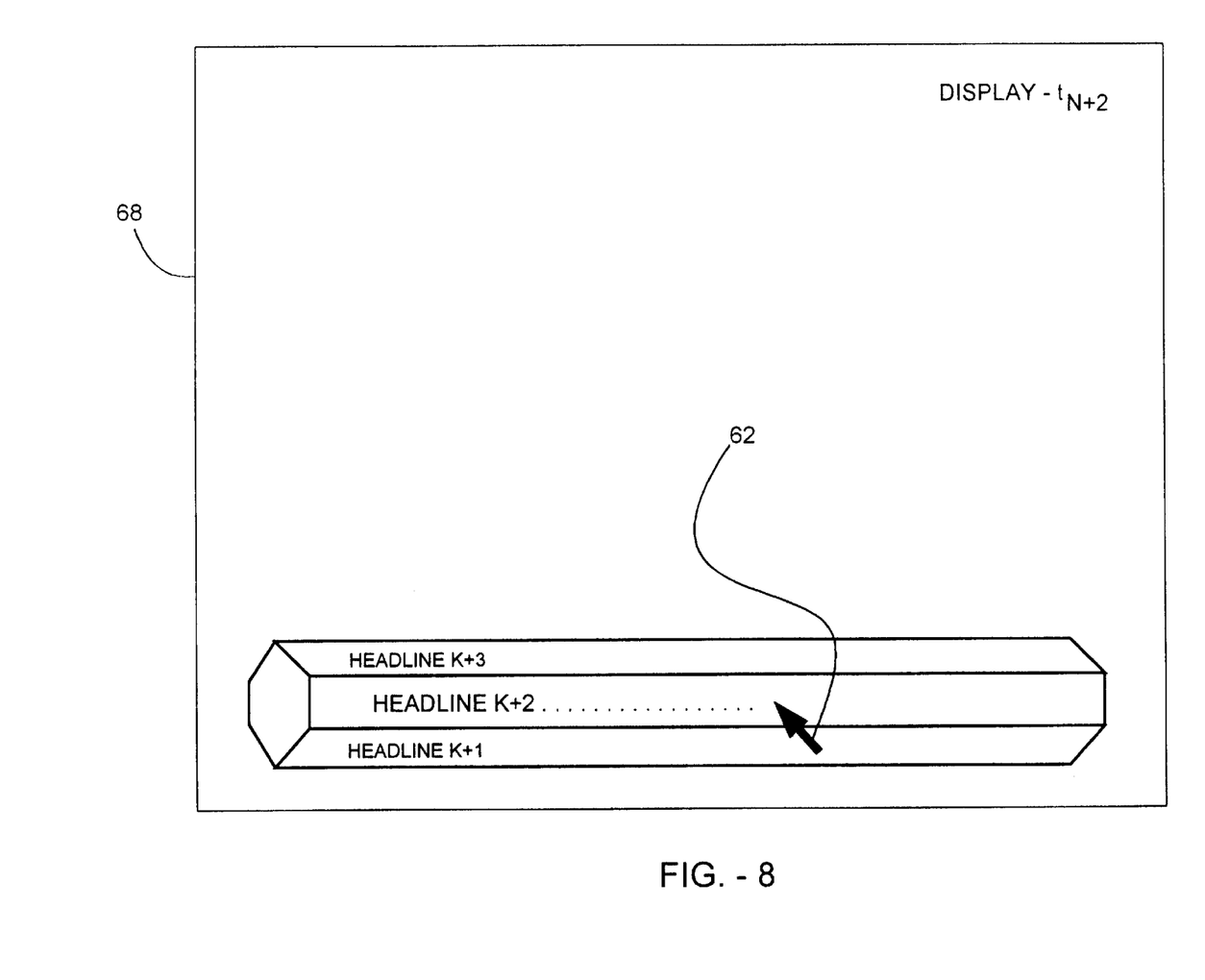
FIG. 8 is a schematic diagram which illustrates use of a displayed cursor to retrieve a news story associated with a displayed headline.
Figure 9:
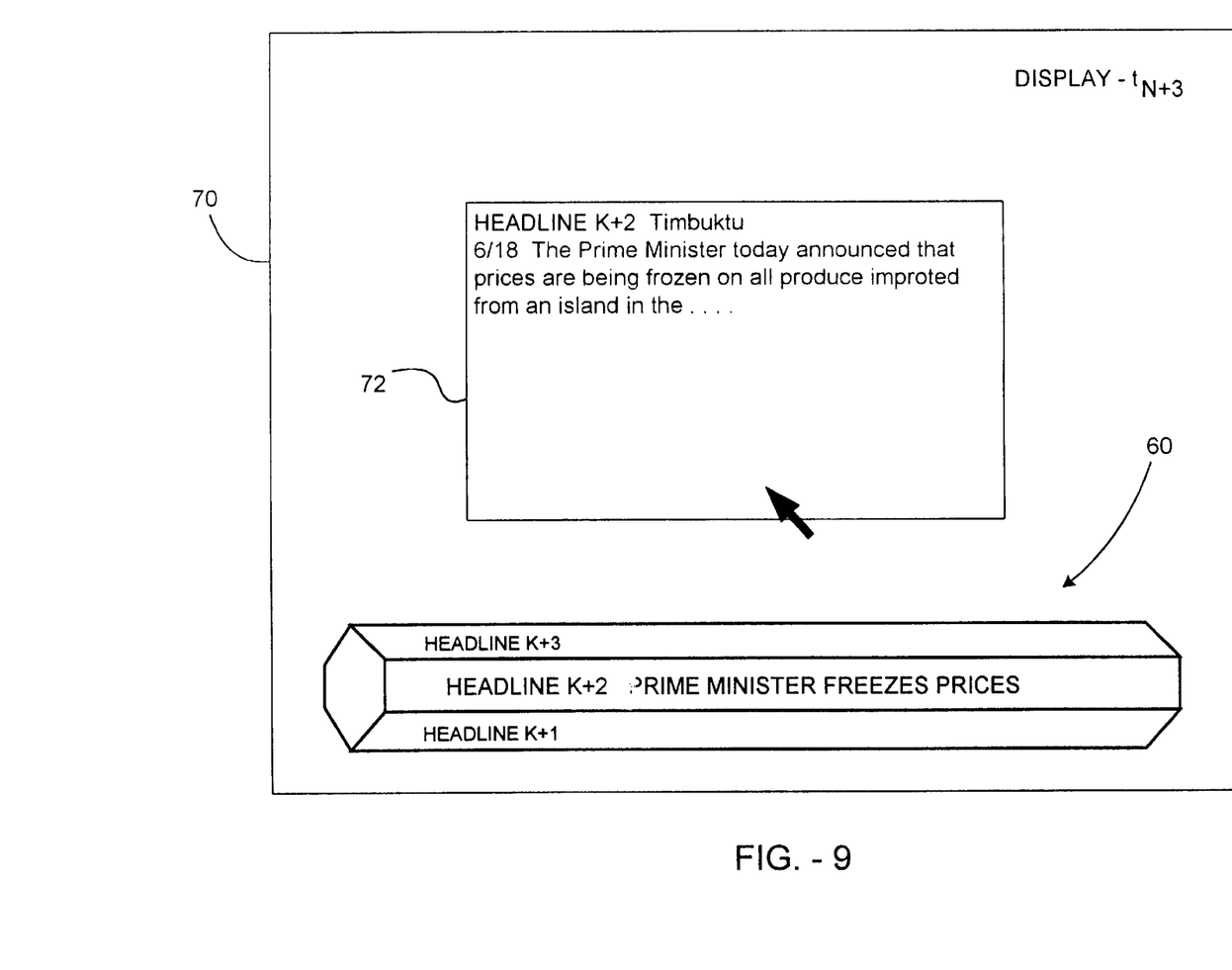
FIG. 9 is a schematic diagram which illustrates the display of a headline and its retrieved, associated news story.

In yet another specific embodiment of the display method 10, the user moves the pointer 62 to the directly forward displayed headline, K+2 in FIG. 8, and double 'clicks.' This user sequence results in a news story associated with the headline K+2 being retrieved and displayed, as shown in FIG. 9, a schematic diagram illustrating a display screen 70 at time $t_{N+3}$. The screen 70 includes the displayed solid hexagon 60 and its headlines and a displayed retrieved news story 72 associated with the headline K+2. This specific embodiment of the display method 10 includes a step of accessing a source from which to retrieve the news stories associated with the headlines of the headline stream 12.

Another embodiment of the invention defines a computer program product for use with a computer system and including a computer readable medium providing instructions for directing the computer system to perform the steps of (1) providing means for receiving a stream of headlines; (2) defining a successor headline for each received headline of the stream; (3) providing means for displaying simultaneously a headline and a predetermined number of successor headlines; (4) providing automatic update means such that at predetermined intervals each displayed headline is replaced by its successor headline; (5) simultaneously displaying the headline and the predetermined number of successor headlines; (6) replacing each displayed headline by its successor headline at the predetermined intervals; and (7) repeating steps (5) and (6) until stopped.

Finally, a specific embodiment of the invention defines a software object for displaying a plurality of headlines from a stream of successive headlines. The object includes a receiving component for receiving a stream of successive headlines, a displaying component for displaying a headline and a predetermined number of successor headlines, an update component for advancing each headline to replace in the display its immediate predecessor, discarding the original headline, and receiving and displaying a new headline, and a time interval generator for activating the update component at predetermined intervals.

Figure 10:
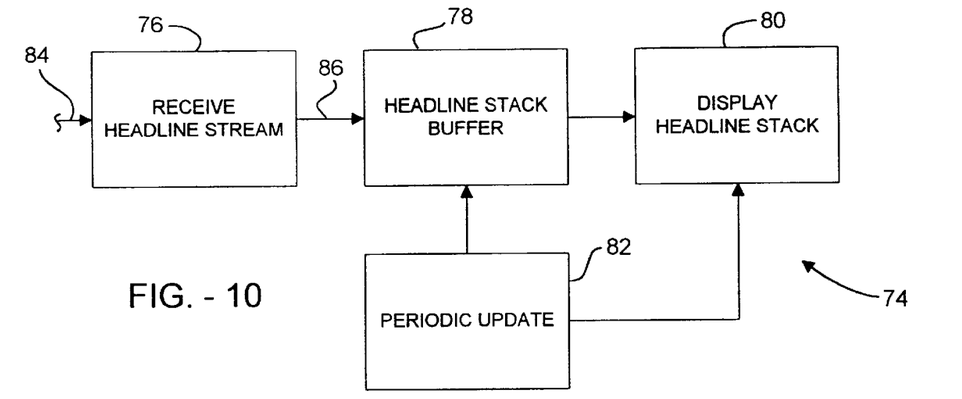
FIG. 10 is a block diagram illustrating a software object for displaying a plurality of headlines from a stream of successive headlines.

Such an object is illustrated in the block diagram of FIG. 10. The object is designated generally by the reference numeral 74, and includes a receiving component 76, a headline stack buffer 78, a displaying component 80, and a periodic update component 82. The object is connected to a headline stream (12 of FIG. 1) by line 84, and the receiving component 76 receives a continuous stream of headlines, each having a successor headline, and each having a predecessor headline (see the discussion of FIG. 1).

The headline stack buffer 78 provides storage for one 'stack' of headlines. In the examples illustrated in FIGS. 1–9, the headline stack buffer 78 provides storage for three headlines. At predetermined intervals the periodic update component 82 causes the headline stack buffer to advance its stored headlines by one storage location, discarding an original headline, and receiving a new headline from the headline receiving component 76 via line 86. When the headline stack buffer 78 has advanced its stored headlines as described, the periodic update component 82 instructs the headline display component 80 to display the current contents of the headline stack buffer 78.

In the normal course of events, headlines arrive via the headline stream (12 of FIG. 1) at a rate determined by the source of the stream. In order to maintain pace with the headline stream so that no headline is missed, it is necessary that the periodic update component 82 be synchronized with the arrival rate of the new headlines. In a specific embodiment of the invention, the headline stack buffer 78 provides buffer storage for a newly arriving headline between update intervals. The process by which the periodic update component 82 is synchronized with the arrival rate of the new headlines is outside the scope of the present invention.

Figure 11:
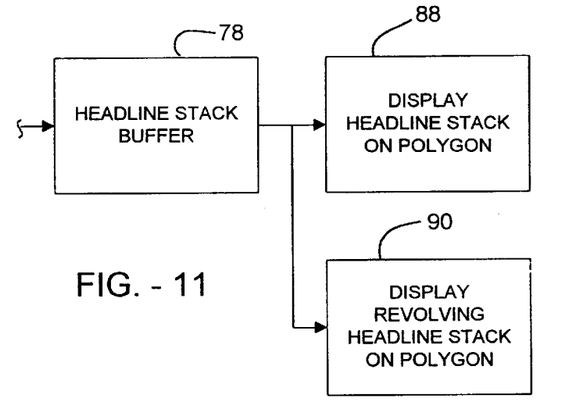
FIG. 11 is a partial block diagram which illustrates the software object of FIG. 10 including an alternative display for periodically rotating displayed headlines.

In another specific embodiment of the headline display object, the headlines are displayed as single lines of symbols along the surfaces of an elongated solid polygon such as described with respect to FIGS. 4–9, above. FIG. 11 is a partial block diagram which illustrates the headline stack buffer 78 shown in FIG. 10, and a pair of display components. Display component 88 displays the current contents of the headline stack buffer 78 (see the description with respect to FIG. 4). When the contents of the headline stack buffer 78 are periodically updated, a second display component 90 is used to display a transition during which the polygon is slowly rotated about its central axis, as described with respect to FIGS. 4 and 5, above. Display then reverts to the steady-state display component 88 for the remainder of a display interval.

In another specific embodiment of the headline display object, the user can position a displayed pointer on a displayed headline and 'click' a control button to effect a change in the display mode, as described above with respect to FIGS. 6–9.

In order to implement an apparent moving forward or backward in the headline stream at will, it is necessary to store a segment of the stream in a headline stream buffer. Movement forward and backward within the stream is possible only to the extent that the headlines are present in the headline stream buffer.

This concept is perhaps more readily understood when we compare it once more to the TV channel discussed previously. The TV channel is constantly sending out a program. If your TV set is turned on and tuned to the channel, you can watch what is being broadcast. But you can't watch at 8PM a program that was broadcast at 7PM. Nor can you watch at 8PM a program that will not be broadcast until 9PM. And yet that's the equivalent of what we allow the computer system user to do with respect to the headline stream.

In order to watch at will programs broadcast at both 7PM and at 9PM, we need to record the 7PM broadcast using a VCR. Then at 9PM we have a choice of which program we will watch. We can watch the program we recorded at 7PM or we can watch the program currently being broadcast at 9PM, or we can switch back and forth between the two.

To permit the user to display headlines which have previously been transmitted via the headline stream, we need to store those past headlines. And to permit the user to display headlines which have not yet been transmitted via the headline stream is impossible. So what we do is provide storage for a segment of the headline stream. Let's assume for the sake of discussion that we store a copy of the previous 100 headlines, and that we are constantly updating the storage so that we always have a copy of the most recently transmitted 100 headlines. Now we can provide a mechanism for the user to go into that stored headline stream segment and select any portion of it he wishes to display.

Figure 12:
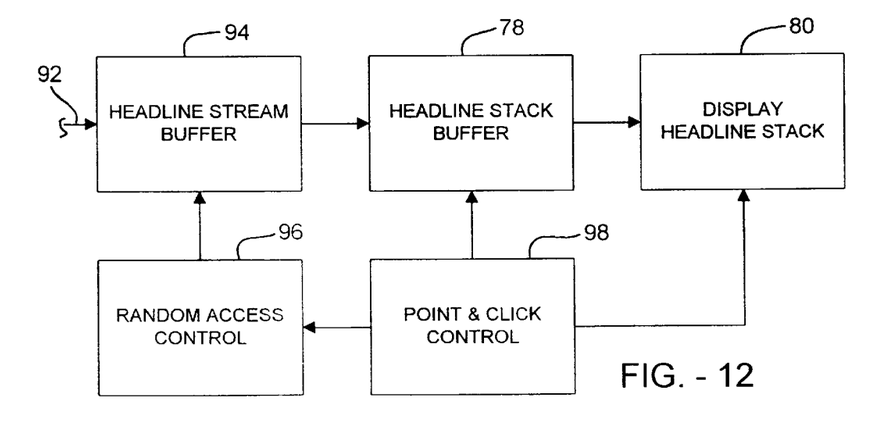
FIG. 12 is a partial block diagram which illustrates a specific embodiment of the software object permitting a user to point and 'click' to examine a selected segment of a headline stream.

With that discussion as background, we return to the present invention and will pick up with FIG. 12, a partial block diagram which illustrates a specific embodiment in which the headline display object permits a user to use the point and 'click' feature of the graphical user interface to examine a selected segment of the headline stream (12 of FIG. 1).

New headlines are received on line 92 and are stored in a headline stream buffer 94. A random access control component 96 permits one headline 'stack' worth of consecutive headlines to be selected from the headline stream buffer 94 under user control. The selected consecutive headlines replace the current contents of the headline stack buffer 78, and the current contents of the headline stack buffer 78 are displayed via the headline display component 80. A user point and 'click' component 98 is used as described with respect to FIGS. 6–9, above, to select a group of consecutive headlines. The only requirement is that the headlines be present in the headline stream buffer 94.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following Claims.

What is claimed is:

1. A method for displaying information in an information processing system such that visual distraction and user stress and fatigue are minimized, the method comprising the steps of:

providing access to a stream of headlines;

defining a successor headline for each accessed headline of the stream;

providing means for displaying an accessed headline;

providing means such that at predetermined intervals the displayed headline is replaced by its successor headline;

displaying the accessed headline as a single, horizontal line of symbols that does not scroll in the horizontal direction;

substituting the successor headline for the displayed headline at the predetermined intervals such that visual distraction and user stress and fatigue are minimized; and repeating the previous two steps until stopped.

2. The method as set forth in claim 1, further including the step of additionally displaying a predetermined number of successor headlines, each as a single, horizontal line of symbols that does not scroll in the horizontal direction.

3. The method as set forth in claim 2, wherein the displayed headlines are stacked vertically in headline stream sequence.

4. The method as set forth in claim 3, wherein the vertically stacked headline displays form the surfaces of a projection of a solid polygonal having a central axis parallel to the displayed headlines such that the adjacent visible polygon surfaces display successor headlines of the headline stream.

5. The method as set forth in claim 4, wherein the headlines are advanced by rotating the displayed solid polygon and its headlines about the central axis at each predetermined interval, and wherein the rate of advance is selected to minimize visual distraction and user stress and fatigue.

6. The method as set forth in claim 5, wherein the rotation pauses between intervals with one surface directly outward toward a viewer and adjacent surfaces foreshortened, and wherein the duration of the pauses is selected to further reduce visual distraction and user stress and fatigue.

7. The method as set forth in claim 6, wherein the polygon has six sides and three headlines are displayed.

8. The method as set forth in claim 4, further including displaying at one end of the solid polygon a projected edge view of the polygon joined compatibly with the displayed polygon surfaces.

9. The method as set forth in claim 5, further defining a predecessor headline of each displayed headline, and wherein the user selects a displayed headline for display on a polygon surface facing directly outward toward a viewer, and for displaying predecessor and successor headlines of the selected headline on other surfaces of the polygon in headline stream sequence, and wherein the user selects the headline by clicking on the headline.

10. The method as set forth in claim 9, further including means responsive to a pointer click on a displayed headline for alternatively stopping and starting the rotation of the displayed polygon and the advance of the displayed headlines when a user clicks on the directly forward displayed headline.

11. The method as set forth in claim 10, wherein the means responsive to a pointer click on a displayed headline initiates a retrieval of a news story associated with the headline when a user double-clicks on the pointed to displayed headline.

12. A computer program product for use with a computer system, comprising:
   a computer readable medium;
   means provided on the medium for directing the computer system to perform the following steps, defining a method for displaying information such that visual distraction and user stress and fatigue are minimized:
   providing means for receiving a stream of headlines;
   defining a successor headline for each received headline of the stream;
   providing means for displaying a received headline;
   providing automatic update means such that at predetermined intervals the displayed headline is replaced by its successor headline;
   displaying the received headline as a single, horizontal line of symbols that does not scroll in the horizontal direction;
   replacing the displayed headline by its successor headline at the predetermined intervals, wherein the successor headline is substituted for the displayed headline;
   the duration of the interval being selected to minimize visual distraction and user stress and fatigue; and
   repeating the displaying and replacing steps until stopped.

13. An object for displaying a plurality of headlines from a stream of successive headlines such that visual distraction and user stress and fatigue are minimized, comprising:
   means for receiving a stream of successive headlines;
   means for displaying a headline and a predetermined number of successor headlines, wherein each headline is displayed as a single, horizontal line of symbols that does not scroll in the horizontal direction;
   means for advancing each headline to replace in the display its immediate predecessor, the original headline being no longer displayed and an immediate successor to the last displayed headline being received and displayed; and
   said advancing means being repeated at a predetermined interval, the duration of the interval being selected to minimize visual distraction and user stress and fatigue.

14. The headline display object as set forth in claim 13, wherein the displayed headlines are stacked vertically in headline stream sequence.

15. The headline display object as set forth in claim 14, wherein the vertically stacked headline displays form the surfaces of a projection of a solid polygonal having a central axis parallel to the displayed headlines such that adjacent visible polygon surfaces display adjacent headlines of the displayed headlines.

16. The headline display object as set forth in claim 15, wherein the headlines are advanced by rotating the displayed solid polygon and its headlines about the central axis at each predetermined interval, and wherein the rotation pauses between intervals with one surface facing directly toward a viewer, and wherein the rate of advance is selected to minimize visual distraction and user stress and fatigue.

17. The headline display object as set forth in claim 16, further including user control means permitting a user to select one displayed headline by the user positioning a displayed pointer to the headline and then clicking on the headline, whereby the selected headline replaces the current headline on the surface facing directly toward a viewer, the user control means defining a predecessor headline for each accessed headline, and predecessor and successor headlines of the selected headline are displayed on other surfaces of the polygon in headline stream sequence.

18. The headline display object as set forth in claim 13, further including means for accessing news stories associated with accessed headlines, and means permitting a user to position a displayed pointer on a displayed headline, then double-click on the headline, initiating a retrieval of a news story associated with the selected headline.

19. The headline display object as set forth in claim 15, wherein the polygon has six sides and three headlines are displayed.

\* \* \* \* \*